United States Patent

Park

Patent Number: 5,911,914
Date of Patent: Jun. 15, 1999

[54] LIQUID CRYSTAL POLYESTER AND METHOD FOR PREPARING THE SAME

[75] Inventor: Young Wook Park, Jinji, Rep. of Korea

[73] Assignee: Korean Research Institute of Chemical Technology, Rep. of Korea

[21] Appl. No.: 08/596,729

[22] Filed: Feb. 5, 1996

[30] Foreign Application Priority Data

Feb. 13, 1995 [KR] Rep. of Korea .......................... 95-2806

[51] Int. Cl.$^6$ ........................... C09K 19/20; C08L 67/06; C08F 283/01
[52] U.S. Cl. ....................... 252/299.67; 523/500; 525/133
[58] Field of Search ........................ 252/299.01, 299.67; 428/1; 523/500; 525/133

[56] References Cited

U.S. PATENT DOCUMENTS

| | | |
|---|---|---|
| 3,778,410 | 12/1973 | Kuhfuss et al. . |
| 4,067,850 | 1/1978 | Kohler et al. . |
| 5,543,476 | 8/1996 | Jones et al. ............................. 525/444 |
| 5,563,216 | 10/1996 | Niwano et al. ............................ 525/65 |

OTHER PUBLICATIONS

Skrifvars et al. "Synthesis and LC–Behavior of Unsaturated Para–linked Aromatic Polyesters by Interfacial Polycondensation", Polymer Prep. 34(2), 1993, pp. 696–697.

Donald, A.M., et al. *Liquid Crystalline Polymers*, Cambridge University Press, Cambridge, U.K., 1992, pp. 58–75 and 286–287.

*Primary Examiner*—Shean C. Wu
*Attorney, Agent, or Firm*—Vorys Sater Seymour & Pease LLP

[57] ABSTRACT

The present invention provide a liquid crystal polyester represented by the formula I

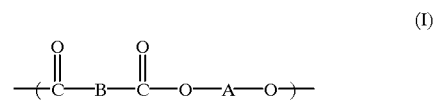

wherein
A is

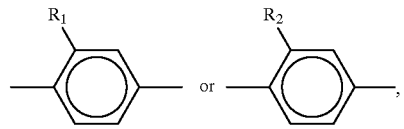

B is

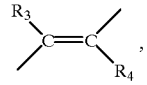

$R_1$ and $R_2$, independently to each other, are hydrogen, halogen or $C_1$–$C_3$ alkyl, and $R_3$ and $R_4$, independently to each other, are hydrogen, halogen or $C_1$–$C_3$ alkyl, which is prepared by using aliphatic fumaric acid as diacid.

The liquid crystal polyester according to the present invention can be prepared in a simple manner, processed directly without separate modification and used in the form of high strength fiber and plastic.

2 Claims, 3 Drawing Sheets

LIQUID CRYSTAL POLYESTER AND METHOD FOR PREPARING THE SAME

The present invention relates to a liquid crystal polyester and a method for preparing the same. More specifically, it relates to a novel liquid crystal polyester having reactive double bonds prepared from unsaturated aliphatic diacid instead of aromatic diacid and a method for preparing the same.

BACKGROUND OF THE INVENTION

Thermotropic liquid crystal polymer has liquid crystal property at specific temperature range. Typical example of thermotropic liquid crystal polymer is aromatic polyester. It is produced by using terephthalic acid and hydroquinone or p-hydroxy benzoic acid and is represented by the following formula:

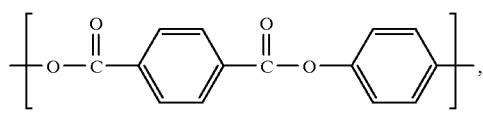

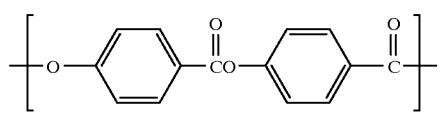

Examples of the methods for preparing liquid crystal polyesters generally include the condensation of aromatic diacid with aromatic diacetate and the condensation of aromatic diacid chloride with aromatic diol. The first method has demerits in that it has poor reactivity so that it should be carried out at very high temperature (>400° C.) under reduced pressure and the reactants should have good heat stability. The second method has good reactivity. However, it has disadvantages in that an excess of tosyl chloride should be used in order to prepare aromatic acid chloride, which makes the process complicated and costly. In addition, the melting points of the polymers prepared by the above methods are higher than decomposition temperature and the polymers are insoluble in solvent so that a great difficulties resides in processing those polymers.

Examples of methods for preparing liquid crystal polymers which can be melt-processed by lowering melting point of polymers are as follows:

Firstly, a method wherein bulky substituent is added into aromatic ring to make a polymer having wide intermolecular space is disclosed in German Patent 2,751,653.

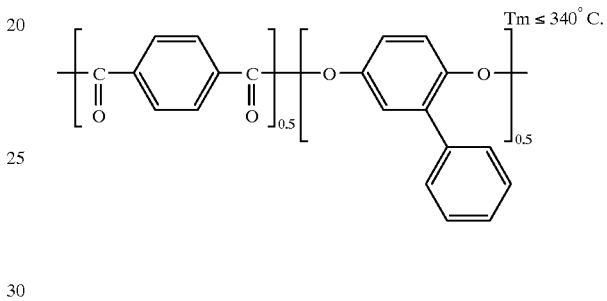

Secondly, a method wherein aromatic compounds having different size are added into main chains to reduce interaction between main chains is disclosed in U.S. Pat. No. 4,067,850.

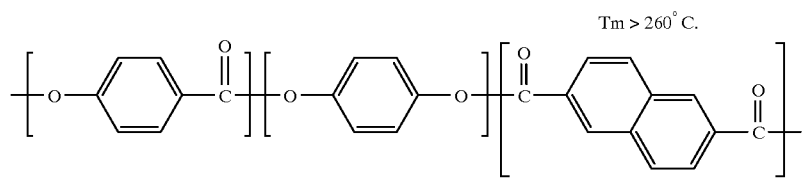

Thirdly, a method wherein flexible aliphatic compound is added into main chain is disclosed in U.S. Pat. No. 3,778,410.

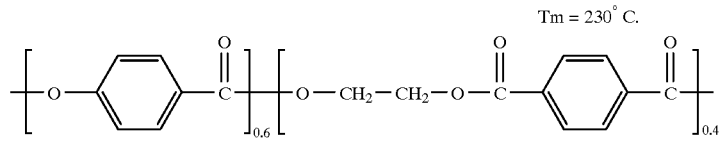

Fourthly, a method wherein non-linear compound is added into main chain to make it bent.

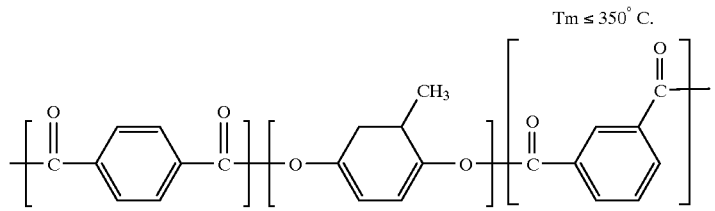

$Tm \leq 350° C.$

The above polymers have liquid crystal property and good physical property. However, they have no economical merit since they are made from very expensive intermediates.

Therefore, a liquid crystal polyester has been needed which can be prepared in a simple manner and low expense, has good processability and act additionally as functional group by means of double bond.

SUMMARY OF THE INVENTION

Figure 1:
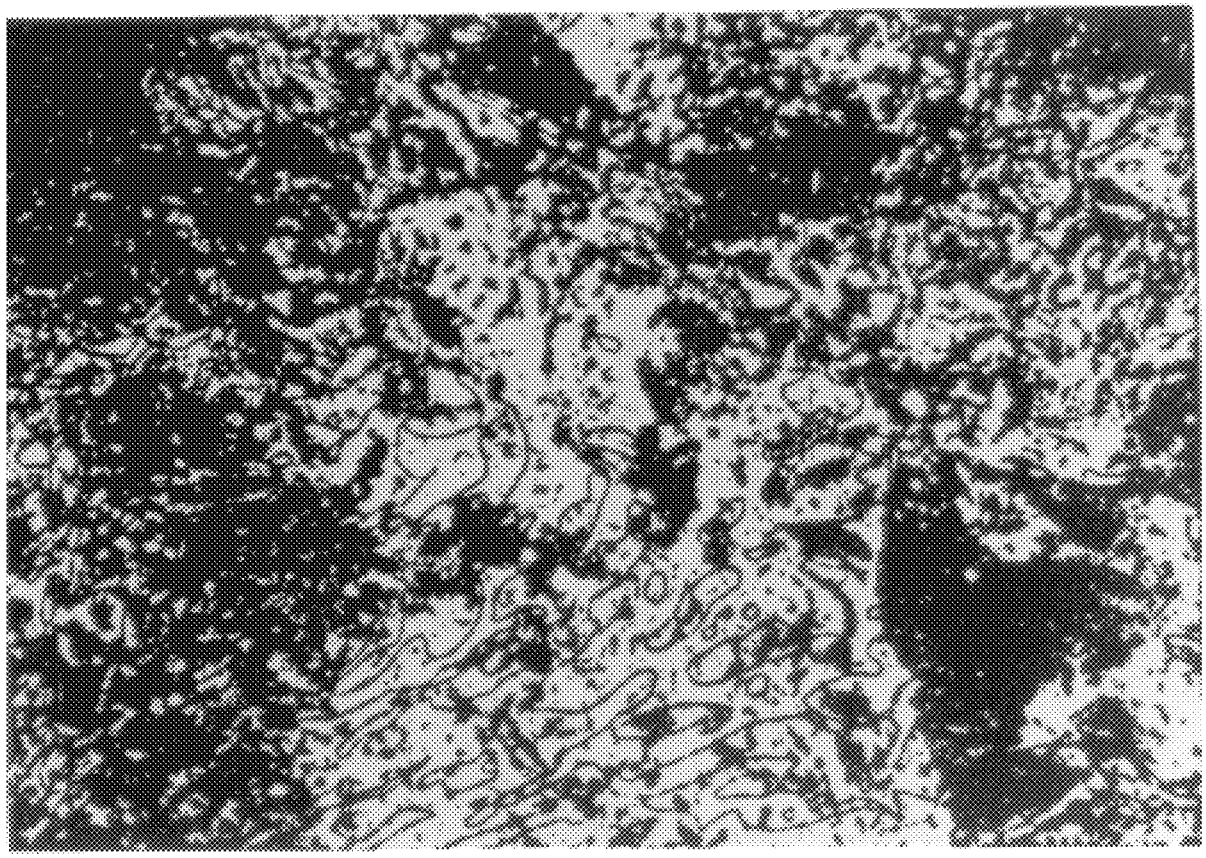
FIG. 1 shows crossed polarized microphotograph (220° C., 100 magnification) of polyester resin prepared according to Example 1 of the present invention.

It is an object of the invention to provide a liquid crystal polyester resin represented by the formula I

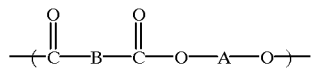
(I)

in which

A is

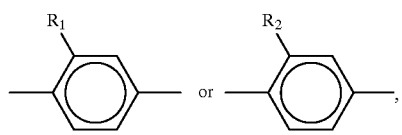

B is

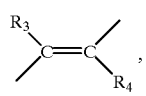

$R_1$ and $R_2$, independently to each other, are hydrogen, halogen or $C_{1-C3}$ alkyl, preferably methyl, and $R_3$ and $R_4$, independently to each other, are hydrogen, halogen or $C_{1-C3}$ alkyl, preferably hydrogen.

It is another object of the invention to provide a method for preparing liquid crystal polyester represented by the formula I

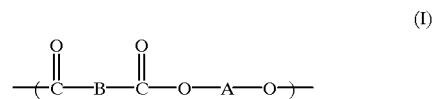
(I)

wherein

A is

B is

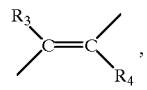

$R_1$ and $R_2$, independently to each other, are hydrogen, halogen or $C_{1-C3}$ alkyl, preferably methyl, and $R_3$ and $R_4$, independently to each other, are hydrogen, halogen or $C_{1-C3}$ alkyl, preferably hydrogen, which comprises polycondensation of compounds of the formula II or III

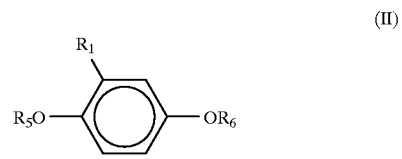
(II)

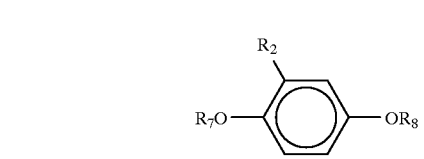
(III)

with compound of the formula IV

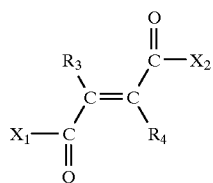

in which

R$_5$, R$_6$, R$_7$ and R$_8$, independently to each other, are hydrogen or C$_1$–C$_5$ acyl group, preferably hydrogen or acetyl, and X$_1$ and X$_2$, independently to each other, are OH or halogen, preferably halogen, more preferably Cl.

Other objects and advantages will be apparent to those of ordinary skill in the art from the following description and drawings.

DETAILED DESCRIPTION OF THE INVENTION

The present invention relates to a liquid crystal polyester and a method for preparing the same.

A liquid crystal polyester resin according to the present invention is represented by the formula I

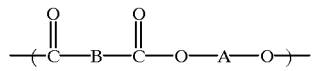

in which

A is

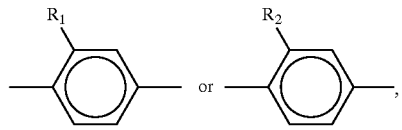

B is

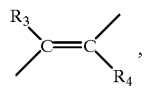

R$_1$ and R$_2$, independently to each other, are hydrogen, halogen or C$_{1-C3}$ alkyl, preferably methyl, and R$_3$ and R$_4$, independently to each other, are hydrogen, halogen or C$_{1-C3}$ alkyl, preferably hydrogen.

The liquid crystal polyester can be prepared by converting diol into diacetate and then condensation of diacetate with dibasic acid. In the above reaction, diacetate is reacted with hydroquinone derivatives and an excess (preferably 10% or so) of acetic anhydride at elevated temperature, preferably 100° C. for a few hours to tens of hours, preferably 10hours using small amount of sulfuric acid as catalyst. The resulting product is poured onto cold water to precipitate, filtered, and recrystallized in ethanol to purify. Polycondensation is carried out at high temperature (~400° C.) under low pressure, for example, 1 mmHg or less in an argon gas.

The liquid crystal polyester can also be prepared by converting dibasic acid into diacid chloride and then condensation of diacid chloride with diol. In the reaction, diacid chloride can be prepared by mixing fumaric acid derivative with an excess of thionyl chloride and then refluxing until solid is disappeared. The resulting product is purified by fractional distillation. Fumaric acid chloride and hydroquinone derivative are mixed in an equivalent ratio with solvent and then refluxed several days while mechanically stirring. Polymer can be recovered by precipitating in acetone and filtered and dried.

The latter method has high reactivity so that polymer can be easily obtained. Aliphatic dibasic acid has better reactivity than that of aromatic dibasic acid and thus can be made easily. The resulting dibasic acid chloride has lower melting point and boiling point over aromatic dibasic chloride so that it can be easily purified by fractional distillation and thus the process becomes simple. Moreover, aliphatic dibasic chloride has better reactivity over aromatic dibasic chloride so that it is easy to obtain polycondensation product.

The method for preparing liquid crystal polyester using diacid chloride are summarized in the following reaction scheme:

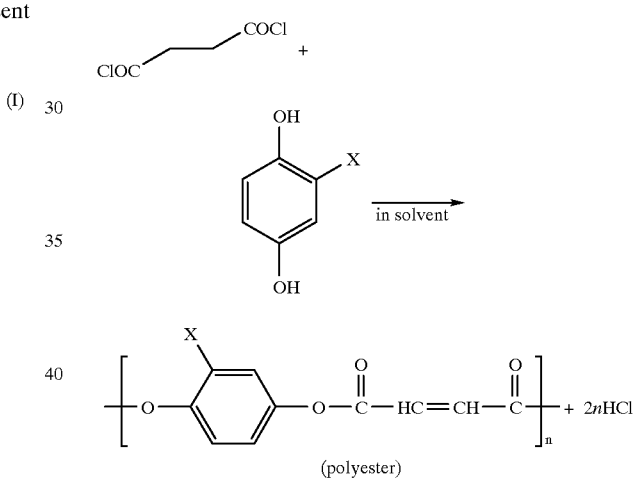

As stated above, the method for preparing liquid crystal polyester according to the present invention can give polymer having good liquid crystal stability since aliphatic fumaric acid derivative is used in the process unlike the existing method wherein aromatic dibasic acid is used. That is, the method according to the present invention can lessen remarkably the demerits of the prior methods, for example, high melting point, cost increase due to the use of cost expensive compound to avoid the high melting point and complicate process due to low reactivity.

The fumaric acid type liquid crystal polyester according to the present invention are different from the existing aromatic polyester in their properties and methods for preparing. For example, in case of aromatic polyester, copolymerization by using expensive compound is needed to reduce the melting point and therefore the cost becomes high. On the other hand, fumaric acid type polyester according to the present invention has proper melting point and the cost is also suitable. Further, fumaric acid has double bond and can be crosslinked similar to unsaturated polyester.

Furthermore, the prior method for preparing liquid crystal polyester use aromatic diacid and thus the reactivity is low. However, since the method of the present invention use aliphatic fumaric acid, the reactivity is high. In addition, to improve the reactivity of acid, in case of aromatic polyester, expensive tosyl chloride should be used in chlorination and the separation process is also complicated. On the other hand, in case of aliphatic polyester, chlorination can be carried out using inexpensive thionyl chloride and purified material can be obtained by fractional distillation. Moreover, the polycondensate of fumaric acid with aromatic diol has very high liquid crystal stability and liquid crystal isotropic liquid-phase transition temperature is too high to be measured, although aliphatic polyester is inferior to aromatic polyester in heat stability.

The liquid crystal polyester prepared by the present invention can be formed into high strength fiber and high strength crosslinked plastic and used various field.

Now, the present invention will be described more specifically with reference to examples hereafter, however it should be noted that the present invention is not intended to be restricted within those specific examples.

EXAMPLE 1

To a 500 ml reactor equipped with dryer, condenser provided caustic soda column and stirrer, was charged 15.2 g (0.1 mole) of fumaric acid dichloride. After 250 cc of o-dichlorobenzene was added, 14.45 g (0.1 mole) of chlorohydroquinone was added. The mixture was refluxed at 180° C. for 2 days while stirring at a rate of 180 rpm. The resulting polymer was precipitated in acetone (500 ml), filtered and dried to recover.

Figure 2:
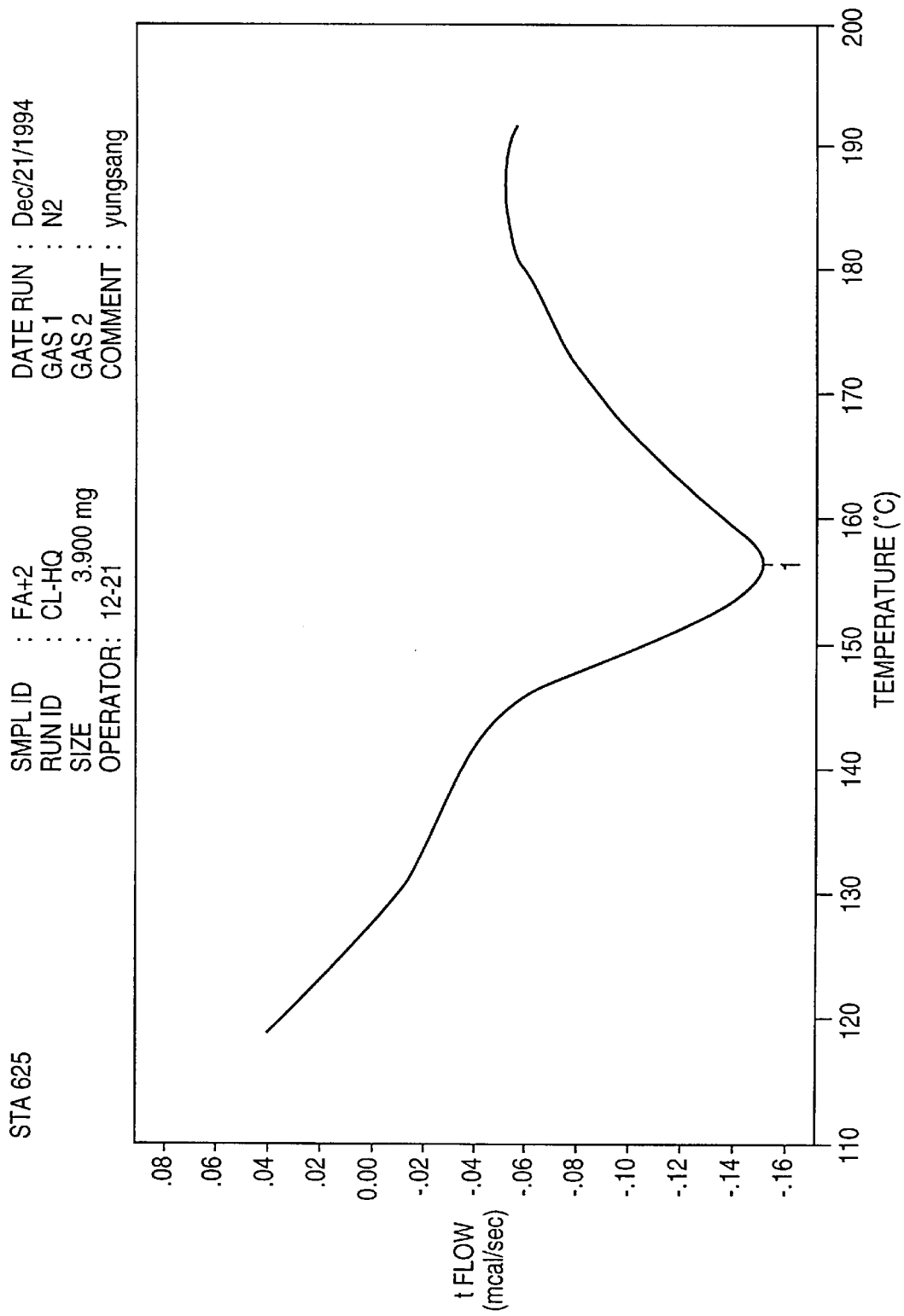
FIG. 2 shows a DSC (Differential Scanning Calorimeter) curve of the polyester resin prepared according to Example 1 of the present invention.
Figure 3:
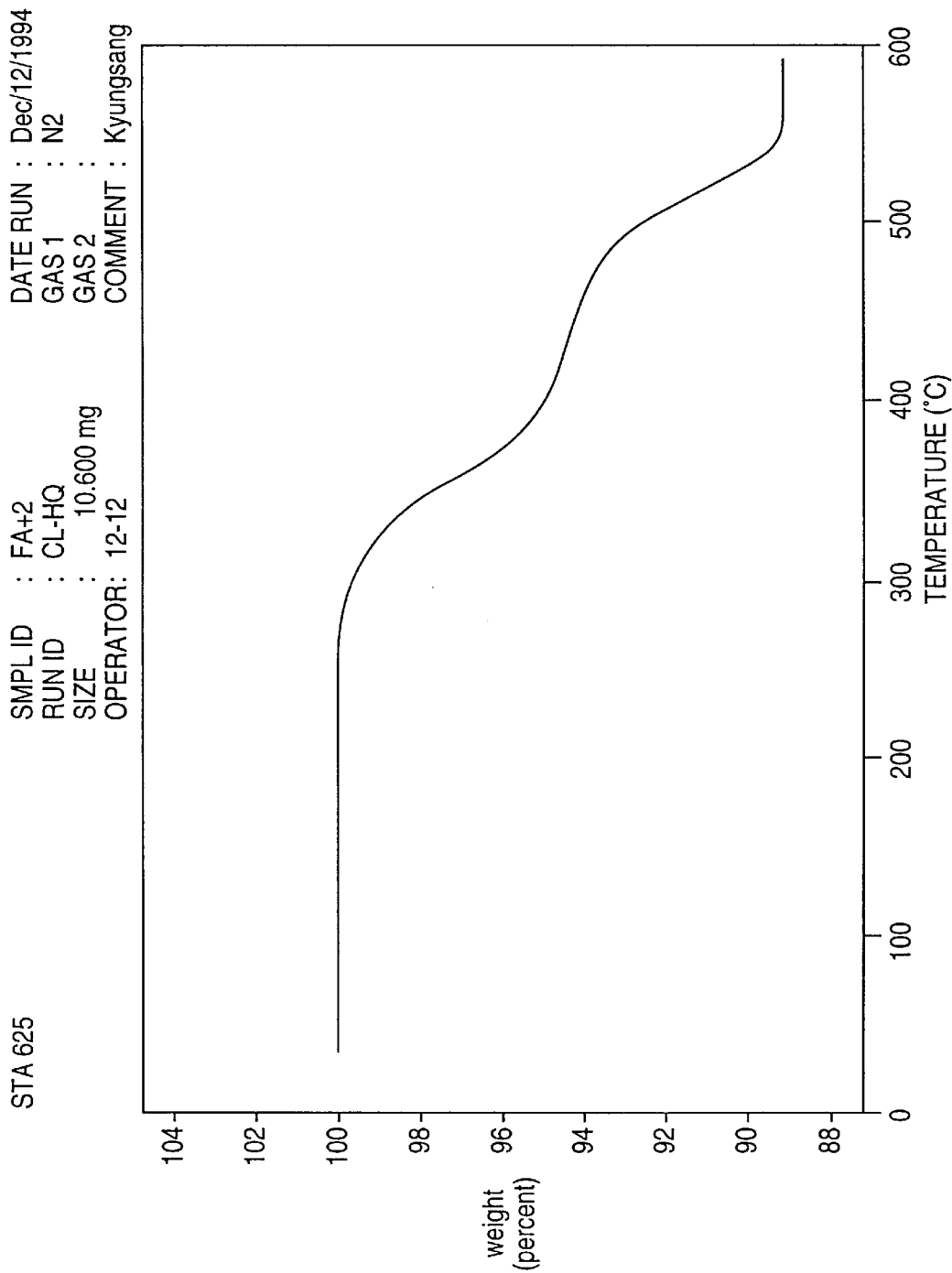
FIG. 3 shows a TGA (Thermogravimetric analysis) curve of the polyester resin prepared according to Example 1 of the present invention.

The obtained polyester was analyzed by crossed polarized microscope (FIG. 1), DSC (FIG. 2), TGA (FIG. 3) and viscometer. The result was summarized in Table 1.

EXAMPLE 2

The procedure of Example 1 was repeated except that 12.4 g (0.1 mole) of methyl hydroquinone was used in place of chlorohydroquinone.

EXAMPLE 3

The procedure of Example 1 was repeated except that 7.225 g (0.05 mole) of chlorohydroquinone and 6.2 g (0.05 mole) of methyl hydroquinone was used in place of chlorohydroquinone.

EXAMPLE 4

The procedure of Example 1 was repeated except that 3.61 g (0.025 mole) of chlorohydroquinone and 9.3 g (0.075 mole) of methyl hydroquinone was used in place of chlorohydroquinone.

EXAMPLE 5

The procedure of Example 1 was repeated except that 9.92 g (0.08 mole) of methyl hydroquinone and 1.24 g (0.02 mole) of ethylene glycol was used in place of chlorohydroquinone.

TABLE 1

| Example | Intrinsic viscosity (dl/g) | Liquid crystal presence | Liquid crystal range (° C.) | Decomposition temperature (° C.) |
|---|---|---|---|---|
| Example 1 | 0.34 | liquid crystal | 157 ~ >300 | 295 |
| Example 2 | 0.13 | liquid crystal | 240 ~ >300 | 290 |
| Example 3 | 0.13 | liquid crystal | 167 ~ >300 | 290 |
| Example 4 | 0.16 | liquid crystal | 179.5 ~ >300 | 290 |
| Example 5 | 0.18 | liquid crystal | 163 ~ >300 | 270 |

What is claimed is:

1. A liquid crystal polyester resin represented by the formula I

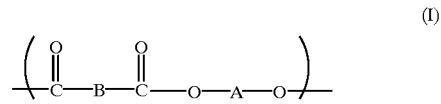 (I)

in which

A is at least one group of the formula

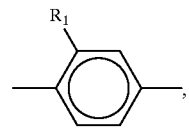

B is

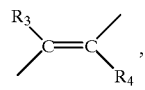

$R_1$ is halogen or methyl, and $R_3$ and $R_4$, independently to each other, are hydrogen, halogen or $C_1$–$C_3$ alkyl.

2. A method for preparing a liquid crystal polyester represented by the formula

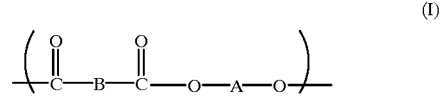 (I)

in which

A is at least one group of the formula

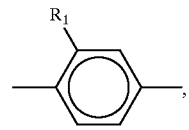

B is

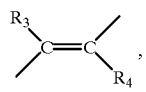

$R_1$ is, halogen or methyl, and $R_3$ and $R_4$, independently of each other, are hydrogen, halogen or $C_1$–$C_3$ alkyl, which comprises polycondensation of at least one compound of the formula II

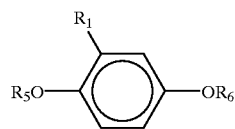
(II)

with a compound of the formula IV

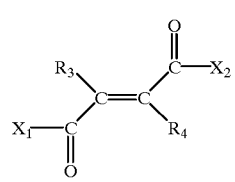
(IV)

in which $R_5$, and $R_6$, independently of each other are hydrogen or $C_1$–$C_5$ acyl group, and $X_1$ and $X_2$, independently of each other are OH or halogen.

* * * * *

UNITED STATES PATENT AND TRADEMARK OFFICE
CERTIFICATE OF CORRECTION

PATENT NO. : 5,911,914
DATED : June 15, 1999
INVENTOR(S) : Young Wook Park

It is certified that error appears in the above-identified patent and that said Letters Patent is hereby corrected as shown below:

On the title page:

Under "[73] Assignee" delete Korean Research Institute of Chemical Technology

Signed and Sealed this

Twenty-second Day of August, 2000

*Attest:*

Q. TODD DICKINSON

*Attesting Officer*     *Director of Patents and Trademarks*